United States Patent
McIntyre

(10) Patent No.: US 11,648,748 B2
(45) Date of Patent: *May 16, 2023

(54) CARPET WASTE COMPOSITE AND METHOD FOR MAKING SAME

(71) Applicant: Advanced Carpet Recycling, LLC, Southlake, TX (US)

(72) Inventor: Daniel R. McIntyre, Dallas, TX (US)

(73) Assignee: ADVANCED CARPET RECYCLING, LLC, Southlake, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,712

(22) Filed: Apr. 5, 2022

(65) Prior Publication Data

US 2022/0227097 A1 Jul. 21, 2022

Related U.S. Application Data

(63) Continuation of application No. 17/162,839, filed on Jan. 29, 2021, now Pat. No. 11,292,230, which is a
(Continued)

(51) Int. Cl.
*B32B 5/26* (2006.01)
*B32B 5/02* (2006.01)
*B32B 5/06* (2006.01)

(52) U.S. Cl.
CPC ............... *B32B 5/26* (2013.01); *B32B 5/024* (2013.01); *B32B 5/06* (2013.01)

(58) Field of Classification Search
CPC .. B32B 5/26; B32B 5/024; B32B 5/06; B32B 2250/04; B32B 2250/05; B32B 2250/20;
(Continued)

(56) References Cited

U.S. PATENT DOCUMENTS

| 7,875,655 B2 | 1/2011 | Mancosh et al. |
| 10,611,121 B2 | 4/2020 | McIntyre |

(Continued)

FOREIGN PATENT DOCUMENTS

| EP | 1264670 | 12/2002 |
| EP | 1795669 | 9/2015 |
| WO | 2013121189 | 8/2013 |

OTHER PUBLICATIONS

Abhishek Jain, Gajendra Pandey, Abhishek K. Singh, Vasudevan Rajagopalan, Fabrication of Structural Composites from Waste Carpet, journal, Oct. 19, 2011, pp. 380-389, Advances in Polymer Technology, vol. 31, No. 4, Wiley Periodicals Inc., U.S.

*Primary Examiner* — Cynthia L Schaller
(74) *Attorney, Agent, or Firm* — Scott Griggs; Griggs Bergen LLP

(57) ABSTRACT

A carpet waste composite and method for making the same are disclosed. In one embodiment of the method, cleaned, unadulterated layers of carpet having a backing side and a tufted side are provided. An initial, unfused carpet layer is made by placing two cleaned, unadulterated layers of carpet tufted side-to-tufted side with homogenous and adhesive contact therebetween. Heat and pressure followed by cooling are applied to furnish an initial, fused carpet layer. An iterative, unfused carpet layer is created by placing two cleaned, unadulterated layers of carpet tufted side-to-tufted side with the initial, fused carpet layer interposed therebetween using adhesive contact. Heat and pressure followed by cooling are applied to furnish an iterative, fused carpet layer. The process of adding layers may continue as required.

20 Claims, 4 Drawing Sheets

Related U.S. Application Data continuation-in-part of application No. 16/774,750, filed on Jan. 28, 2020, now Pat. No. 10,981,354, which is a continuation of application No. 16/528,332, filed on Jul. 31, 2019, now Pat. No. 10,611,121.

(60) Provisional application No. 62/967,893, filed on Jan. 30, 2020, provisional application No. 62/715,401, filed on Aug. 7, 2018.

(58) Field of Classification Search
CPC ............ B32B 2255/02; B32B 2255/26; B32B 2260/021; B32B 2260/048; B32B 2262/0253; B32B 2262/0261; B32B 2262/0276; B32B 2262/14; B32B 2307/402; B32B 2307/54; B32B 2307/554; B32B 2307/71; B32B 2307/7145; B32B 2307/7265; B32B 2419/00; B32B 2471/00; B32B 2605/10; B32B 5/022; B32B 5/08; B32B 7/12; B32B 1/00; Y02W 30/62
See application file for complete search history.

(56) References Cited

U.S. PATENT DOCUMENTS

| | | |
|---|---|---|
| 2004/0224589 A1 | 11/2004 | Bacon et al. |
| 2007/0082172 A1 | 4/2007 | Derbyshire et al. |
| 2020/0231735 A1 | 7/2020 | Salsman |

CARPET WASTE COMPOSITE AND METHOD FOR MAKING SAME

PRIORITY STATEMENT & CROSS-REFERENCE TO RELATED APPLICATIONS

This application is a continuation of U.S. application Ser. No. 17/162,839, entitled "Carpet Waste Composite and Method for Making Same", filed on Jan. 29, 2021 in the name of Daniel R. McIntyre, now U.S. Pat. No. 11,292,230, issued on Apr. 5, 2022; which claims benefit of U.S. Application Ser. No. 62/967,893 entitled "Carpet Waste Composite and Method for Making Same", filed on Jan. 30, 2020 in the name of Daniel R. McIntyre; which is hereby incorporated by reference, in entirety, for all purposes.

U.S. application Ser. No. 17/162,839, now U.S. Pat. No. 11,292,230 is also a continuation-in-part of U.S. application Ser. No. 16/774,750 entitled "Carpet Waste Composite and Method for Making Same", filed on Jan. 28, 2020 in the name of Daniel R. McIntyre, now U.S. Pat. No. 10,981,354, issued on Apr. 20, 2021; which is a continuation of U.S. application Ser. No. 16/528,332 entitled "Carpet Waste Composite and Method for Making Same", filed on Jul. 31, 2019 in the name of Daniel R. McIntyre, now U.S. Pat. No. 10,611,121, issued on Apr. 7, 2020; which claims priority from U.S. Application Ser. No. 62/715,401 entitled "Carpet Waste Composite and Method for Making Same" and filed on Aug. 7, 2018 in the name of Daniel R. McIntyre; all of which are hereby incorporated by reference, in entirety, for all purposes.

TECHNICAL FIELD OF THE INVENTION

This invention relates, in general, to composites and, in particular, to carpet waste composites and a method for making the same that are used in various industrial, construction, and consumer applications requiring tensile strength and resistance to environmental factors including ultraviolet light and insects, for example.

BACKGROUND OF THE INVENTION

With increased emphasis on recycling and re-use, attention has turned to alternatives to disposing of carpet waste in landfills, whether the carpet waste is a result of new carpet production or post-consumer use. As composites may be used in various industrial, construction, and consumer applications requiring tensile strength and resistance to environmental factors including ultraviolet light and insects, for example, efforts are focused on diverting carpet waste from landfills and utilizing the carpet waste in the production of composites. In fact, some studies indicate as much as six billion pounds of carpet waste may be deposited in landfills in the United States each year. A need exists for carpet waste composites with acceptable performance that may be efficiently and effectively manufactured.

SUMMARY OF THE INVENTION

It would be advantageous to achieve a carpet waste-based composite that performs in various industrial, construction, and consumer applications. It would also be desirable to enable a thermomechanical solution that furnishes an efficient process for the production of composites with carpet waste sourced from landfill diversion and new carpet production. To better address one or more of these concerns, in one aspect of the invention, a carpet waste composite and method for making the same are disclosed. In one embodiment of the method, unadulterated layers of carpet having a backing side and a tufted side are provided. An initial, unfused carpet layer is made by placing multiple cleaned, unadulterated layers of carpet tufted side-to-tufted side with homogenous and adhesive contact therebetween. Heat and pressure followed by cooling are applied to furnish an initial, fused carpet layer. An iterative, unfused carpet layer is created by placing multiple cleaned, unadulterated layers of carpet tufted side-to-tufted side with the initial, fused carpet layer interposed therebetween using adhesive contact. Heat and pressure followed by cooling are applied to furnish an iterative, fused carpet layer. The process of adding layers may continue as required.

In other aspects of the teachings presented herein, and in one embodiment of the method, unadulterated layers of carpet having a backing side and a tufted side are provided. An initial, unfused carpet layer is made by placing multiple cleaned, unadulterated layers of carpet tufted side-to-tufted side with homogenous and adhesive contact therebetween. Heat and pressure followed by cooling are applied to furnish an initial, fused carpet layer. An iterative, unfused carpet layer is created by placing multiple cleaned, unadulterated layers of carpet tufted side-to-tufted side with the initial, fused carpet layer interposed therebetween using non-adhesive, non-binding contact therebetween. Heat and pressure followed by cooling are applied to furnish an iterative, fused carpet layer. The process of adding layers may continue as required.

In still other aspects of the teachings presented herein, and in one embodiment of the method, unadulterated layers of carpet having a backing side and a tufted side are provided. An initial, unfused carpet layer is made by placing multiple cleaned, unadulterated layers of carpet tufted side-to-tufted side with homogenous and adhesive contact therebetween. Heat and pressure followed by cooling are applied to furnish an initial, fused carpet layer. An iterative, unfused carpet layer is created by placing multiple cleaned, unadulterated layers of carpet tufted side-to-tufted side with the initial, fused carpet layer interposed therebetween using non-adhesive, non-binding contact therebetween. Heat and pressure followed by cooling are applied to furnish an iterative, fused carpet layer. The process of adding layers may continue as required.

In further aspects of the teachings presented herein, variations in the methodology are disclosed and taught. By way of example, the layers of carpet may be positioned tufted side-to-backing side or backing side-to-backing side at various stages in the methodology. Different numbers of multiple layers of carpet, such as two, four, or more, may be used initially or at other stages of the methodology to create the unfused carpet layer. In another aspect, the unadulterated layers of carpet may include by weight percent, 1% to 5%, for example, of additives. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
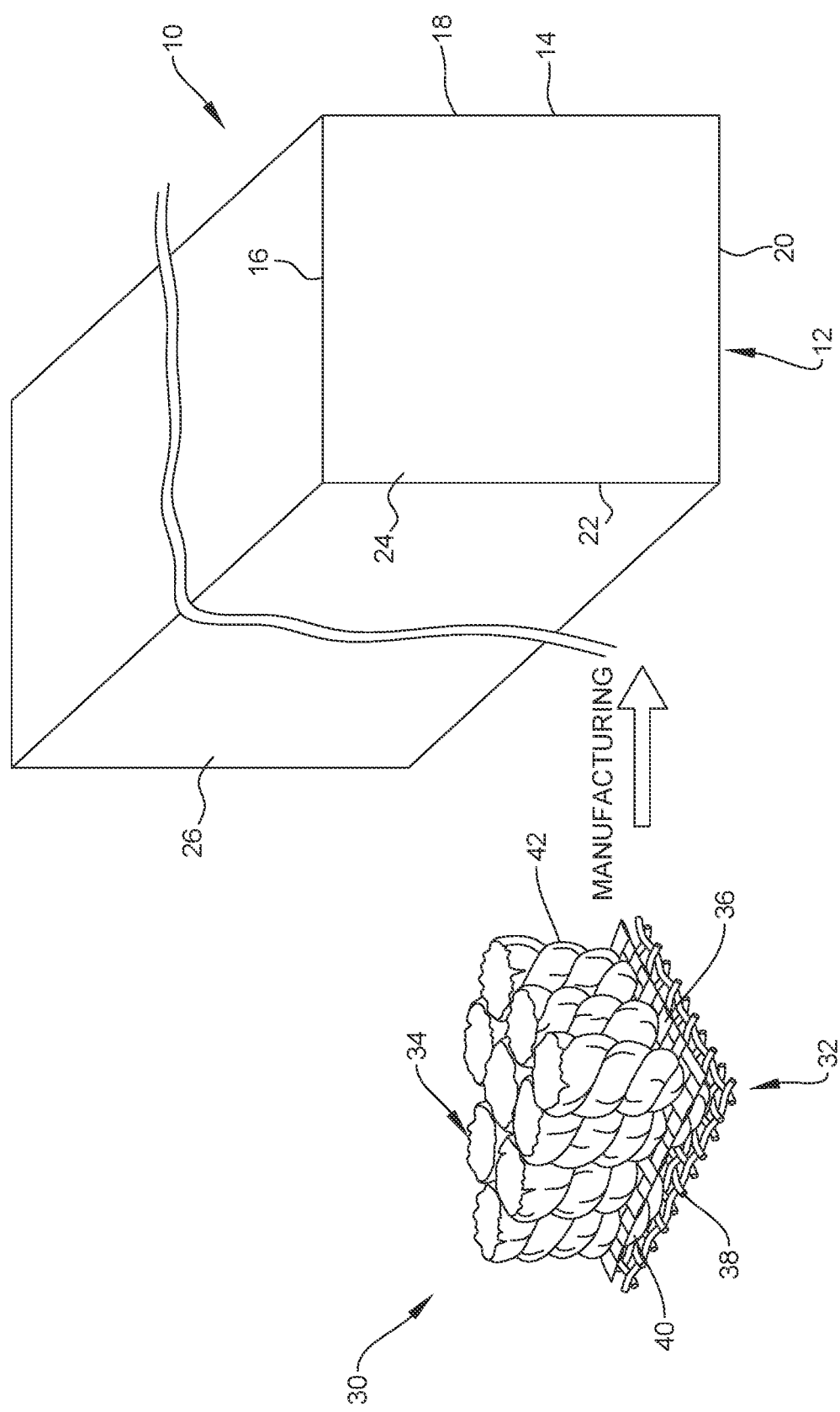
FIG. 1 is a schematic diagram depicting one embodiment of a carpet waste composite manufactured from carpet waste, according to the teachings presented herein.

Referring initially to FIG. 1, therein is depicted one embodiment of a carpet waste composite, which is schematically illustrated and generally designated 10. The carpet waste composite 10 is shown as a rectangular support member 12 having a body 14 with sides 16, 18, 20, 22 and ends 24, 26. Although the carpet waste composite 10 is depicted as a rectangular support member 12, it should be appreciated that the carpet waste composite 10 may take any form for various industrial, construction, and consumer applications. The carpet waste composite 10 may be used as a rail tie, a crossing tie, or in another rail application. Additionally, the carpet waste composite 10 may be utilized in various construction applications needing deck supports, bridge supports, beams, and other support members. Further, it should be appreciated that although the carpet waste composite 10 is depicted as having a rectangular shape, the form may vary and be engineered, shaped, and angled according to the needs of the particular application.

The carpet waste composite 10 is manufactured from carpet waste 30, which may be sourced from landfill diversion or new carpet production, for example. In one embodiment, the carpet waste 30 includes a backing side 32 having a tufted side 34 extending therefrom. The backing side 32 may include a primary backing fabric 36 and a secondary backing fabric 38 with a binding agent 40 bonding the primary backing fabric 36 to the secondary backing fabric 38. As depicted, the primary backing fabric 36 of the backing side 32 is located in contact with the tufted side 34. The backing side 32 provides tuft-binds for securing the tufted side 34 to the carpet, which ensures imperviousness to moisture and resistance to edge raveling. The tufted side 34 includes face yarns 42 and offers carpet characteristics such as durability, abrasion resistance, texture retention, stain and soil resistance, colorfastness, ease of cleaning, and color clarity, for example.

The carpet waste 30 may be sourced from various carpets, such as polypropylene carpets, nylon 6 carpets, nylon 6,6 carpets, and polyester carpets, or combinations thereof, for example. The vast majority of carpets manufactured in the United States are tufted carpets and of all tufted carpets, the vast majority are manufactured with thermoplastic face yarns. Major face yarn types currently used in the manufacture of tufted carpets are nylon yarns, normally composed of poly(epsilon-caprolactam) or poly(hexamethylene adipamide), also known as nylon-6 and nylon 6,6, respectively; propylene polymer yarns, typically composed of propylene homopolymer; and polyester yarns, normally composed of polyethylene terephthalate. Primary backings for tufted carpets are typically woven fabrics made of synthetic yarns, although nonwoven fabrics can also be used. The most common synthetic material used in primary backing fabrics is polypropylene, although polyesters also find use in the industry. Again, it will be appreciated that the vast majority of backings for tufted carpets are manufactured from thermoplastics. The carpet finishing operation typically involves application of a latex binder (typically a filled thermoset resin emulsion) and a secondary backing fabric. The material most typically used for carpet back coating is styrene butadiene latex (SBR), usually a carboxylated SBR. The overwhelming majority of tufted carpet today is finished by laminating a secondary backing fabric to the tufted primary backing fabric with a latex.

Figure 2:
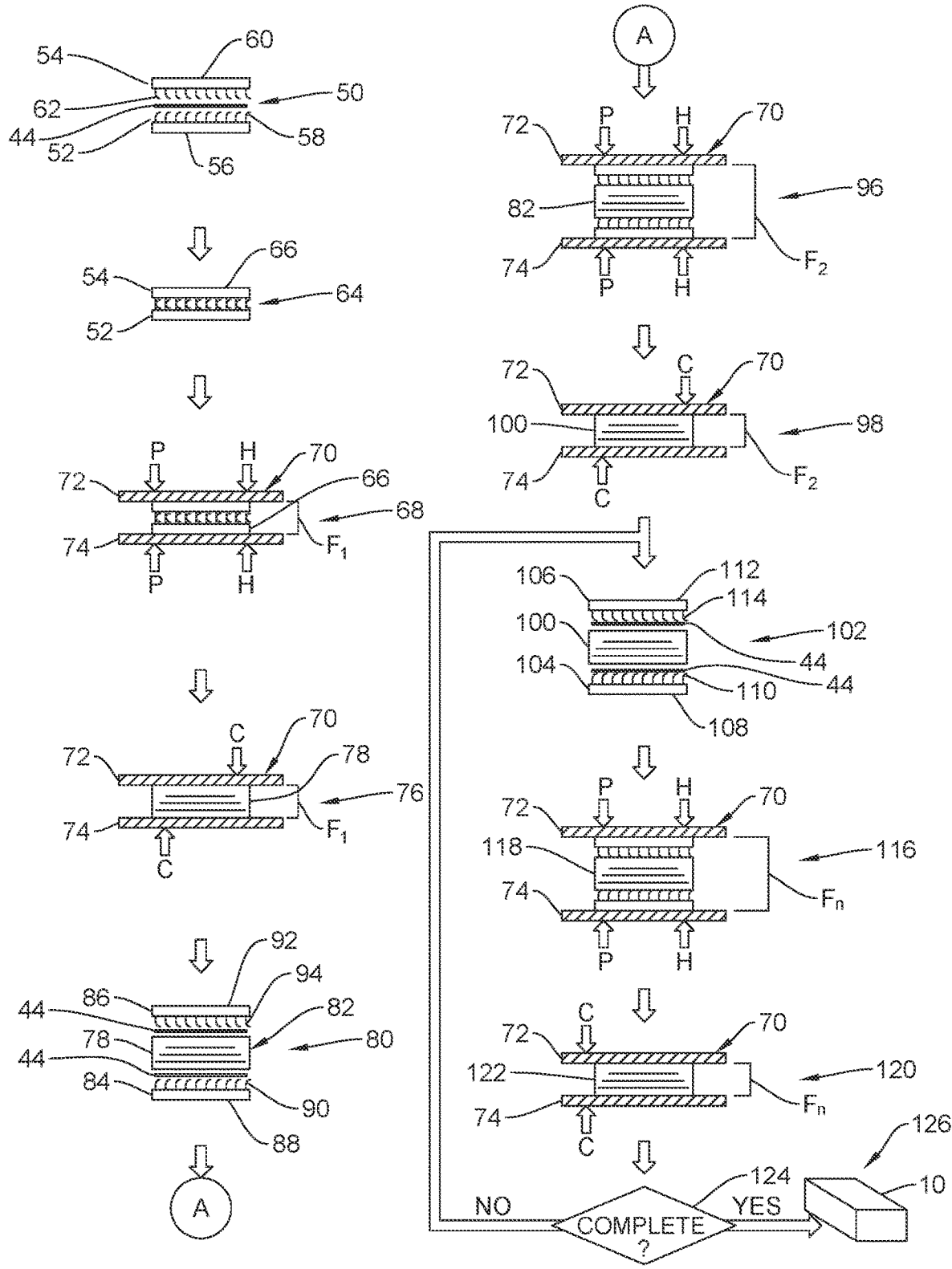
FIG. 2 is a schematic flow chart depicting one embodiment of a method for making a carpet waste composite according to the teachings presented herein.

Referring to FIG. 2, therein is depicted one embodiment of a method for making the carpet waste composite 10 utilizing an adhesive material 44. By way of example and not by way of limitation, the adhesive material 44 may be a urethane adhesive. In another implementation, the adhesive material 44 may be a urethane adhesive derived from a PET polyol reacted with an isocyanate. In still another implementation, the adhesive material 44 may include or be a fire retardant. In a still further implementation, the adhesive material 44 may include an epoxy, melamine, formaldehyde, or a combination thereof, with or without the aforementioned urethane adhesive. As discussed, the adhesive material 44 may be any adhesive suitable for adhesion and bonding properties discussed herein and the adhesive material selected will depend on the intended application or applications of the carpet waste composite 10.

At block 50, a supply of cleaned, unadulterated layers of carpet 52, 54 are provided, which in one embodiment includes the aforementioned carpet waste composite 10. Although cleaned, unadulterated layers of carpet 52, 54 are provided, it should be appreciated that the supply of carpet may be uncleaned and adulterated. The supply of cleaned, unadulterated layers of carpet 52, 54 may be the same type of carpet or different types of carpet. That is, the systems and methods presented herein may be utilized with mixed carpet stock. The cleaned, unadulterated layer of carpet 52 includes a backing side 56 and a tufted side 58. In one implementation, the backing side 56 is not separated from the tufted side 58. That is, the cleaned, unadulterated layer of carpet 52 may be unseparated. Further, the cleaned, unadulterated layer of carpet 52 may be unshredded and without grinding as unground. In one embodiment, intact carpet that is unseparated, unshredded, and unground is utilized. The cleaned, unadulterated layer of carpet 54 includes a backing side 60 and a tufted side 62. In one implementation the backing side 60 is not separated from the tufted side 62. That is, the cleaned, unadulterated layer of carpet 54 may be unseparated. Further, the cleaned, unadulterated layer of carpet 54 may be unshredded and without grinding as unground. As previously mentioned, the cleaned, unadulterated layers of carpet 52, 54 may be sourced from various carpets, such as aforementioned polypropylene carpets, nylon 6 carpets, nylon 6,6 carpets, and polyester carpets, or combinations thereof, for example. The cleaned, unadulterated layers of carpet 52, may be carpet waste 30 that is sourced from landfill diversion or scraps and remainder pieces from new carpet production. The cleaned, unadulterated layers of carpet 52, 54 may be cleaned by a thorough combing and vacuuming to remove any debris. In one embodiment, during the cleaning process, additional compounds and chemicals are not added, so that the cleaned, unadulterated layers of carpet 52, 54 remain unadulterated.

At block 64, the cleaned, unadulterated layers of carpet 52, 54 are positioned tufted side-to-tufted side with homogenous and adhesive contact, provided by the adhesive material 44, therebetween. At block 64, an initial, unfused carpet layer 66 is created by placing the cleaned, unadulterated layers of carpet 52, 54 tufted side-to-tufted side with homogenous and adhesive contact therebetween.

At block 68, heat H and pressure P are applied to the initial, unfused carpet layer 66 within a carrier 70 having vertically spaced plates 72, 74 at a fixed height $F_1$. By way of example and not by way of limitation, the vertically spaced plates 72, 74 may comprise aluminum plates. Further, the heat H and pressure P operations may be executed by a heated conveyor.

In one embodiment, the fixed height $F_1$ may be a distance from 80 thousandths of an inch (0.20 cm) to 280 thousandths of an inch (0.71 cm). Additionally, the fixed height $F_1$ may be a distance from 130 thousandths of an inch (0.33 cm) to 230 thousandths of an inch (0.58 cm). In a further embodiment, the fixed height $F_1$ may be 180 thousandths of an inch (0.46 cm). The heat H applied may be between 200° F. (102° C.) and 800° F. (426° C.), in one embodiment. In another embodiment, the heat H applied may be between 250° F. (121° C.) and 450° F. (232° C.), in one embodiment. In still another embodiment, the heat H applied may be 350° F. (176° C.). The pressure P applied may be a continuous physical force to hold the initial, unfused carpet layer 66 at the fixed height $F_1$. In one implementation the continuous physical force may squeeze the initial, unfused carpet layer 66 at the fixed height $F_1$.

At block 76, cooling C is applied to the initial, unfused carpet layer 66 to form an initial, fused carpet layer 78 within a carrier 70 having vertically spaced plates 72, 74 at a fixed height $F_1$. By way of example and not by way of limitation, the vertically spaced plates 72, 74 may comprise aluminum plates or steel plates. By way of example and not by way of limitation, the cooling C operations may be executed by a cooling conveyor. In one embodiment, the cooling C applied may be a temperature at 35° F. (1.7° C.) to 100° F. (37° C.) In another embodiment, the cooling C applied may be 42° F. (5.6° C.). The cooling C may be applied thermomechanically or by ambient conditions, for example.

At block 80, an iterative, unfused carpet layer 82 is created by placing cleaned, unadulterated layers of carpet 84, 86 tufted side-to-tufted side with the initial, fused carpet layer 78 interposed therebetween. The cleaned, unadulterated layer of carpet 84 includes a backing side 88 and a tufted side 90. The cleaned, unadulterated layer of carpet 86 includes a backing side 92 and a tufted side 94. As previously mentioned, the cleaned, unadulterated layers of carpet 84, 86 may be sourced from various carpets, such as aforementioned polypropylene carpets, nylon 6 carpets, nylon 6,6 carpets, and polyester carpets, or combinations thereof, for example. The cleaned, unadulterated layers of carpet 84, may be carpet waste 30 that is sourced from landfill diversion or scraps and remainder pieces from new carpet production. The cleaned, unadulterated layers of carpet 84, 86 may be cleaned by a thorough combing and vacuuming to remove any debris. During the cleaning process, additional compounds and chemicals are not added, so that the cleaned, unadulterated layers of carpet 84, 86 remain unadulterated.

Continuing with block 80, the cleaned, unadulterated layers of carpet 84, 86 are positioned tufted side-to-tufted side with homogenous and adhesive contact, provided by the adhesive material 44, with the initial, fused carpet layer 78 therebetween. At block 96, heat H and pressure P are applied to the iterative, unfused carpet layer 82 within the carrier 70 having the vertically spaced plates 72, 74 with a fixed height $F_2$. The fixed height $F_2$ may be greater than the fixed height $F_1$. In the illustrated embodiment, the carrier 70 in block 96 is identical to the carrier 70 in block 68. It should be appreciated that the carriers may be different in other implementations. By way of example and not by way of limitation, the heat H and pressure P operations may be executed by the heated conveyor as previously described.

In one embodiment, the fixed height $F_2$ may be a distance that is twice the fixed height $F_1$. That is, the fixed height $F_2$ may be a distance from 160 thousandths of an inch (0.41 cm) to 560 thousandths of an inch (1.42 cm). Additionally, the fixed height $F_2$ may be a distance from 260 thousandths of an inch (0.66 cm) to 460 thousandths of an inch (1.17 cm). In a further embodiment, the fixed height $F_2$ may be 360 thousandths of an inch (0.91 cm). The heat H applied may be between 400° F. (204° C.) and 800° F. (426° C.) in one embodiment. In another embodiment, the heat H applied may be 600° F. (315° C.). The pressure P applied may be a continuous physical force to hold the iterative, unfused carpet layer 82 at the fixed height $F_2$.

At block 98, cooling C is applied to the iterative, unfused carpet layer 82 to form an incremental, fused carpet layer 100. By way of example and not by way of limitation, the cooling C operations may be executed by the cooling conveyor as previously described. In one embodiment, the cooling C applied may be a temperature at 35° F. (1.7° C.) to 100° F. (37° C.). In another embodiment, the cooling C applied may be 42° F. (5.6° C.).

At block 102, a further incremental, unfused carpet layer 118 is created by placing cleaned, unadulterated layers of carpet 104, 106 tufted side-to-tufted side with the incremental, fused carpet layer 100 interposed therebetween with the adhesive material 44 providing the adhesive contact. The cleaned, unadulterated layer of carpet 104 includes a backing side 108 and a tufted side 110. The cleaned, unadulterated layer of carpet 106 includes a backing side 112 and a tufted side 114. As previously mentioned, the cleaned, unadulterated layers of carpet 104, 106 may be sourced from various carpets, such as aforementioned polypropylene carpets, nylon 6 carpets, nylon 6,6 carpets, and polyester carpets, or combinations thereof, for example. The cleaned, unadulterated layers of carpet 104, 106 may be carpet waste that is sourced from landfill diversion or scraps and remainder pieces from new carpet production. The cleaned, unadulterated layers of carpet 104, 106 may be cleaned by a thorough combing and vacuuming to remove any debris. During the cleaning process, additional compounds and chemicals are not added, so that the cleaned, unadulterated layers of carpet 104, 106 remain unadulterated.

At block 116, heat H and pressure P are applied to the further incremental, unfused carpet layer 118 within the carrier 70 having the vertically spaced plates 72, 74 with a fixed height $F_n$, which may be $F_3$, in instances where a third layer is being manufactured. In general, the fixed height $F_n$ may be greater than the fixed height $F_2$ and the fixed height $F_1$. By way of example and not by way of limitation, the heat H and pressure P operations may be executed by the heated conveyor previously described at the heat H and pressure P conditions previously described. In one embodiment, the fixed height $F_n$ may be n times the fixed height $F_1$. So, when n equals 3, then the fixed height $F_n$ may be $F_n=3$, which is 3 times the fixed height $F_1$. Similarly, when n equals 4, then the fixed height $F_n$ may be $F_{n=4}$, which is 4 times the fixed height $F_1$.

At block 120, cooling C is applied to the further incremental, unfused carpet layer 118 to form a further incremental, fused carpet layer 122. By way of example and not by way of limitation, the cooling C operations may be executed by the cooling conveyor previously discussed at the previously discussed cooling C.

At decision block 126, if the carpet waste composite 10 is complete, then the methodology ends at block 124. On the other hand, if additional incremental thickness is required, then the process returns to blocks 102, 116, and 120 to incrementally add another layer and the fixed height $F_n$ increases incrementally. As each layer is added, in one embodiment, the fixed height $F_n$ may incrementally increase by a fixed height equal to the fixed height $F_1$. It should be appreciated that variations in the methodology of FIG. 2 are within the teachings presented herein. By way of example and not by way of limitation, the layers of carpet may be positioned tufted side-to-backing side or backing side-to-backing side at various stages in the methodology. That is, the layers of carpet may be positioned side-to-side, including tufted side-to-tufted side, tufted side-to-backing side, backing side-to-tufted side, or backing side-to-backing side. Further, at block 50, multiple layers of carpet, such as four, may be used initially or at other stages of the methodology to create the unfused carpet layer.

As mentioned, it should be appreciated that variations in the methodology of FIG. 2 are within the teachings presented herein. By way of further example, the cleaned, unadulterated layers of carpet may include by weight percent, 1% to 5% of additives. Also as mentioned, the layers of carpet may include adhesive and binding contact therebetween provided by an adhesive material 44, including various binders, by weight percent, of 5% to 50%. More particularly, the adhesive material 44 may comprise between 10% and 30%, by weight, of the carpet waste composite 10. By way of another example, the cleaned, unadulterated layers of carpet may be positioned side-to-side with non-homogenous and selective adhesive contact therebetween.

Figure 3A:
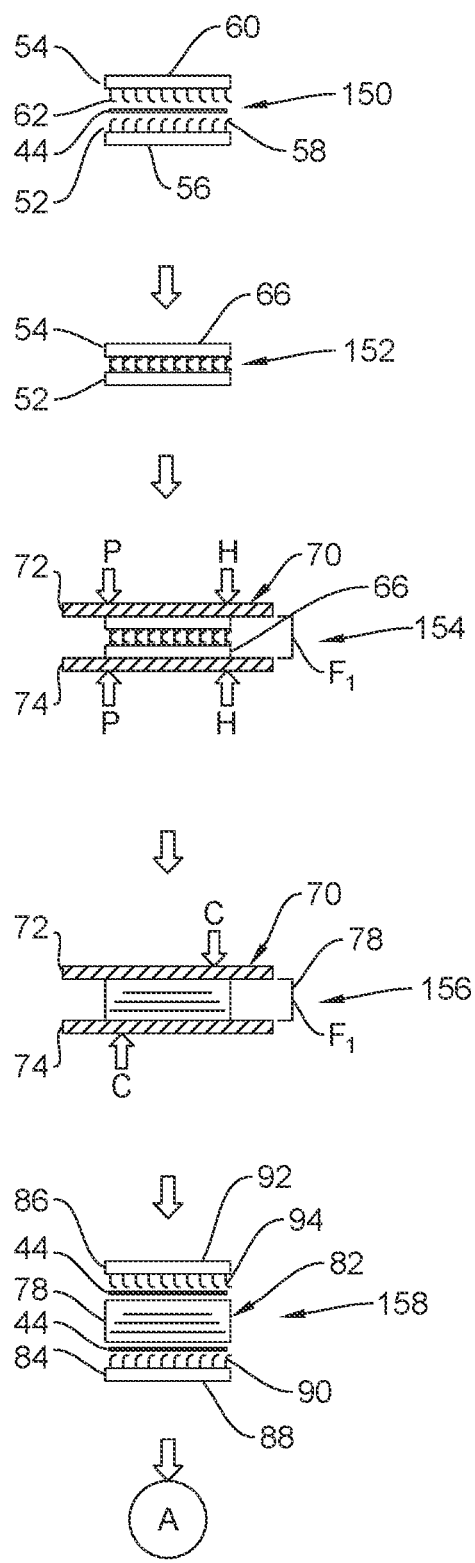
FIGS. 3A and 3B, together, are a schematic flow chart depicting another embodiment of a method for making a carpet waste composite according to the teachings presented herein.
Figure 3B:
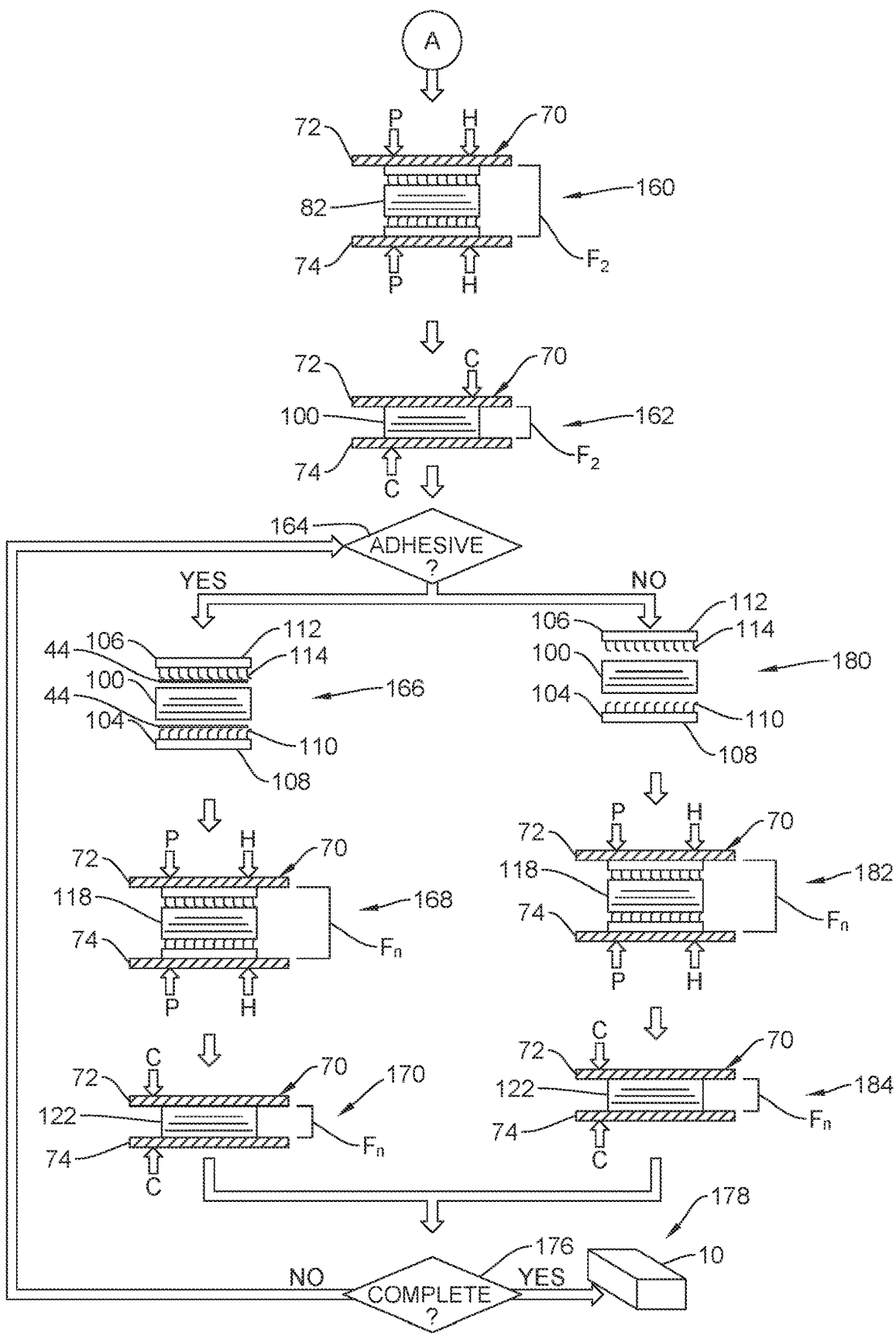

Referring to FIGS. 3A and 3B, therein is depicted one embodiment of a method for making the carpet waste composite 10 selectively utilizing the adhesive material 44, including various binders, for example. In the embodiment presented in FIGS. 3A and 3B, the adhesive material 44 is selectively utilized for certain layers of carpet in accordance with strength and weight demands of the application. The adhesive material 44 may be used in a single layer or in multiple layers. In the embodiment shown in FIGS. 3A and 3B, the adhesive material 44 is utilized in the initial layer and in the iterative layers as needed. By way of example and not by way of limitation, the heat H and pressure P operations as well as the cooling C operations may be executed in a manner similar to that described in FIG. 2.

At block 150, the supply of cleaned, unadulterated layers of carpet 52, 54 are provided, which in one embodiment includes the aforementioned carpet waste composite 10. Although the cleaned, unadulterated layers of carpet 52, 54 are provided, it should be appreciated that the supply of carpet may be uncleaned and adulterated. The supply of cleaned, unadulterated layers of carpet 52, 54 may be the same type of carpet or different types of carpet. That is, the systems and methods presented herein may be utilized with mixed carpet stock. The cleaned, unadulterated layer of carpet 52 includes the backing side 56 and the tufted side 58. The cleaned, unadulterated layer of carpet 54 includes the backing side 60 and the tufted side 62. At block 150, the cleaned, unadulterated layers of carpet 52, 54 are positioned tufted side-to-tufted side with homogenous and adhesive contact, provided by the adhesive material 44, therebetween. At block 152, the initial, unfused carpet layer 66 is created by placing the cleaned, unadulterated layers of carpet 52, 54 tufted side-to-tufted side with homogenous and adhesive contact therebetween. At block 154, heat H and pressure P are applied to the initial, unfused carpet layer 66 within a carrier 70 having vertically spaced plates 72, 74 at a fixed height $F_1$.

At block 156, cooling C is applied to the initial, unfused carpet layer 66 to form an initial, fused carpet layer 78. At block 158, an iterative, unfused carpet layer 82 is created by placing cleaned, unadulterated layers of carpet 84, 86 tufted side-to-tufted side with the initial, fused carpet layer 78 interposed therebetween. The cleaned, unadulterated layer of carpet 84 includes the backing side 88 and the tufted side 90. The cleaned, unadulterated layer of carpet 86 includes the backing side 92 and the tufted side 94. At block 158, the cleaned, unadulterated layers of carpet 84, 86 are positioned tufted side-to-tufted side with homogenous and non-adhesive contact therebetween. At block 160, heat H and pressure P are applied to the iterative, unfused carpet layer 82 within the carrier 70 having the vertically spaced plates 72, 74 with a fixed height $F_2$. The fixed height $F_2$ may be greater than the fixed height $F_1$. In the illustrated embodiment, the carrier 70 in block 160 is identical to the carrier 70 in block 154. It should be appreciated that the carriers may be different in other implementations.

At block 162, cooling C is applied to the iterative, unfused carpet layer 82 to form an incremental, fused carpet layer 100. At decision block 164, subsequent incremental carpet layers may be created with or without the use of adhesive. If adhesive is selected, at block 166, a further incremental, unfused carpet layer 118 is created by placing cleaned, unadulterated layers of carpet 104, 106 tufted side-to-tufted side with the incremental, fused carpet layer 100 interposed therebetween with the adhesive material 44 providing the adhesive contact. The cleaned, unadulterated layer of carpet 104 includes the backing side 108 and the tufted side 110. The cleaned, unadulterated layer of carpet 106 includes the backing side 112 and the tufted side 114.

At block 168, heat H and pressure P are applied to the further incremental, unfused carpet layer 118 within the carrier 70 having the vertically spaced plates 72, 74 with a fixed height $F_n$, which may be $F_3$ in instances where a third layer is being manufactured. In general, the fixed height $F_n$ may be greater than the fixed height $F_2$ and the fixed height $F_1$. In one embodiment, the fixed height $F_n$ may be n times the fixed height $F_1$. So, when n equals 3, then the fixed height $F_n$ may be $F_n=3$, which is 3 times the fixed height $F_1$. Similarly, when n equals 4, then the fixed height $F_n$ may be $F_{n=4}$, which is 4 times the fixed height $F_1$. At block 170, cooling C is applied to the further incremental, unfused carpet layer 118 to form a further incremental, fused carpet layer 122.

At decision block 176, if the carpet waste composite 10 is complete, then the methodology ends at block 178. On the other hand, if additional incremental thickness is required, then the process returns to decision block 164. As mentioned, at decision block 164, if an incremental carpet layer is needed with adhesive, then the methodology returns to blocks 166, 168, and 170. On the other hand, at the decision block 164, if an incremental carpet layer is needed without adhesive, then the methodology advances to block 180.

If an adhesive is not selected, at block 180, a further incremental, unfused carpet layer 118 is created by placing cleaned, unadulterated layers of carpet 104, 106 tufted side-to-tufted side with the incremental, fused carpet layer 100 interposed therebetween with homogenous and non-adhesive, non-binding contact therebetween. The cleaned, unadulterated layer of carpet 104 includes the backing side 108 and the tufted side 110. The cleaned, unadulterated layer of carpet 106 includes the backing side 112 and the tufted side 114.

At block 182, heat H and pressure P are applied to the further incremental, unfused carpet layer 118 within the carrier 70 having the vertically spaced plates 72, 74 with a fixed height $F_n$, which may be $F_3$ in instances where a third layer is being manufactured. In general, the fixed height $F_n$ may be greater than the fixed height $F_2$ and the fixed height $F_1$. In one embodiment, the fixed height $F_n$ may be n times the fixed height $F_1$. So, when n equals 3, then the fixed height $F_n$ may be $F_{n=3}$ may be 3 times the fixed height $F_1$. Similarly, when n equals 4, then the fixed height $F_n$ may be $F_{n=4}$ may be 4 times the fixed height $F_1$. At block 184, cooling C is applied to the further incremental, unfused carpet layer 118 to form a further incremental, fused carpet layer 122. The process then advances to the previously discussed decision block 176.

It should be appreciated that as each layer is added, in one embodiment, the fixed height may incrementally increase by a fixed height equal to the fixed height $F_1$. It should be appreciated that variations in the methodology of FIGS. 3A and 3B are within the teachings presented herein. By way of example and not by way of limitation, the layers of carpet may be positioned tufted side-to-backing side or backing side-to-backing side at various stages in the methodology. That is, the layers of carpet may be positioned side-to-side, including tufted side-to-tufted side, tufted side-to-backing side, backing side-to-tufted side, or backing side-to-backing side. Further, at various steps, multiple layers of carpet, such as four or 10 or 16, may be used initially or at other stages of the methodology to create the unfused carpet layer. The unfused carpet layer may then be bonded together with the adhesive, in some implementations, for utilization in the methodology and manufacturing of the carpet waste composite. By way of another example, the cleaned, unadulterated layers of carpet may be positioned side-to-side with non-homogenous and selective adhesive contact therebetween. By way of further example, the unadulterated layers of carpet may include, by weight percent, 1% to 5% of additives. As mentioned, the layers of carpet may selectively include adhesive and binding contact therebetween provided by an adhesive material 44, including various binders, by weight percent, of 5% to 50%. Furthermore, Portland cement may be utilized as part of, in place of, or in addition to the adhesive to create the bond.

With respect to the adhesive, which may be 5% to 50%, by weight, of the carpet waste composite, or in some implementations, 10% to 30% by weight, of the carpet waste composite, the adhesive may be selected from urethane adhesives, epoxy adhesives, melamine adhesives, and formaldehyde adhesives, for example. Urethan adhesives and, in particular, polyurethane thermosetting adhesives and phenolic glues have particular efficacy. The percent weight of adhesive will depend on how much adhesive is utilized as well as how many layers include the adhesive contact.

Embodiments according to the teachings presented herein will now be illustrated by reference to the following non-limiting working examples wherein procedures and materials are solely representative of those which can be employed, and are not exhaustive of those available and operative. The following glossary enumerates the components utilized in the Examples and Test Methods presented hereinbelow.

Blended carpet is textile floor covering including nylon carpet and polyester carpet.

Nylon carpet is a textile floor covering including nylon 6 and nylon 6,6 yarns.

Phenolic adhesive is an adhesive manufactured by Georgia Pacific (Atlanta, Ga.).

Polyester carpet is textile floor covering, including polyester yarns, normally composed of polyethylene terephthalate.

Polyurethane adhesive is adhesive manufactured by Huntsman Corporation (The Woodlands, Tex.).

Example I. A carpet waste composite is made from a supply of cleaned, unadulterated layers of polyester carpet. The cleaned, unadulterated layers of polyester carpet were cleaned by a thorough combing and vacuuming to remove any debris. During the cleaning process, additional compounds and chemicals were not added, so that the polyester carpet is unadulterated. For Example I, an adhesive application was prepared such that 30%, by weight, of the adhesive utilized was polyurethane adhesive and 70%, by weight, of the adhesive utilized was phenolic adhesive. The inner layers forming part of a thick core (approximately 1.5" (3.8 cm)) of the carpet waste composite are bonded with the phenolic adhesive and the other layers are bonded with the polyurethane adhesive. In this manner, approximately 70% of the layers are bonded with phenolic adhesive and 30% of the layers are bonded with the polyurethane adhesive.

A composite construction material was formed with seventy-five (75) layers of the polyester carpet by initially placing two layers of the polyester carpet tufted side-to-tufted side with homogenous and adhesive contact within the heated conveyor equipment with a fixed height of 70 thousandths of an inch (0.180 cm) at a heat of 350° F. (176° C.) and pressure of 1300 psi (about 8900 kPa) for 15 minutes. Cooling at 75° F. (23.9° C.) was then applied for 5 minutes. Iteratively, cleaned, unadulterated layers of carpet tufted side-tufted side were added with adhesive contact under the same heat, pressure, and cooling process with an iterative height increase of 141 thousand of inches (0.360 cm). In Example I, the adhesive was 10%, by weight, of the carpet waste composite.

Example II. A carpet waste composite is made from a supply of cleaned, unadulterated layers of blended carpet. The cleaned, unadulterated layers of blended carpet was cleaned by a thorough combing and vacuuming to remove any debris. During the cleaning process, additional compounds and chemicals were not added, so that the blended carpet is unadulterated. For Example II, an adhesive application was prepared such that 30%, by weight, of the adhesive utilized was polyurethane adhesive and 70%, by weight, of the adhesive utilized was phenolic adhesive. The inner layers forming part of a thick core (approximately 1.5" (3.8 cm)) of the carpet waste composite are bonded with the phenolic adhesive and the other layers are bonded with the polyurethane adhesive. In this manner, approximately 70% of the layers are bonded with phenolic adhesive and 30% of the layers are bonded with the polyurethane adhesive.

A composite construction material was formed with layers of the blended carpet by initially placing two layers of the blended carpet tufted side-to-tufted side with homogenous and adhesive contact within the heated conveyor equipment with a fixed height of 70 thousandths of an inch (0.180 cm) at a heat of 350° F. (176° C.) and pressure of 1300 psi (about 8900 kPa) for 15 minutes. Cooling at 75° F. (23.9° C.) was then applied for 5 minutes. Iteratively, cleaned, unadulterated layers of carpet tufted side-tufted side were added with adhesive contact under the same heat, pressure, and cooling process with an iterative height increase of 141 thousandths of an inch (0.360 cm). In Example II, the adhesive was 30%, by weight, of the carpet waste composite.

Example III. A carpet waste composite is made from a supply of cleaned, unadulterated layers of blended carpet. The cleaned, unadulterated layers of blended carpet was cleaned by a thorough combing and vacuuming to remove any debris. During the cleaning process, additional compounds and chemicals were not added, so that the blended carpet is unadulterated. For Example III, an adhesive application was prepared such that 30%, by weight, of the adhesive utilized was polyurethane adhesive and 70%, by weight, of the adhesive utilized was phenolic adhesive. The inner layers forming part of a thick core (approximately 1.5" (3.8 cm)) of the carpet waste composite are bonded with the phenolic adhesive and the other layers are bonded with the polyurethane adhesive. In this manner, approximately 70% of the layers are bonded with phenolic adhesive and 30% of the layers are bonded with the polyurethane adhesive.

A composite construction material was formed with layers of the blended carpet by initially placing two layers of the blended carpet tufted side-to-tufted side with homogenous and non-adhesive, non-binding contact within the heated conveyor equipment with a fixed height of 70 thousandths of an inch (0.180 cm) at a heat of 350° F. (176° C.) and pressure of 1300 psi (about 8900 kPa) for 15 minutes. Cooling at 75° F. (23.9° C.) was then applied for 5 minutes. Iteratively, cleaned, unadulterated layers of carpet tufted side-tufted side were added with adhesive contact under the same heat, pressure, and cooling process with an iterative height increase of 141 thousandths of an inch (0.360 cm). In Example III, the adhesive was 46%, by weight, of the carpet waste composite.

Test Method I. Three carpet waste composites in accordance with teachings presented herein and manufactured in conformity with each of Example I, Example II, and Example III were tested according to the standard test method for plastic composite cross ties prescribed in the American Railway Engineering and Maintenance-of-way Association (AREMA) Guidance for Plastic Composite Cross Ties. This test method covers the determination of the properties of modules of elasticity, modulus of rupture, rail seat compression, single tie lateral push, spike/screw pull-out, and thermal expansion. Table I, Table II, and Table III depict the AREMA Guidance for Plastic Composite Cross Ties test results for the Ex. I, Ex. II, and Ex. III Carpet Waste Composites.

TABLE I

AREMA Guidance for Plastic Composite Cross Ties Test Results for Select Carpet Waste Composites in accordance with Example I
AREMA Guidance for Plastic Composite Cross Ties (Example I)

| | | |
|---|---|---|
| Modulus of Elasticity | Min. - 170,000 psi | PASSED |
| Modulus of Rupture | Min. - 2,000 psi | PASSED |
| Rail Seat Compression | Min. - 900 psi | PASSED |
| Single Tie Lateral Push | Min. - 2,000 lbf | PASSED |
| Spike/Screw Pullout | Min. - 1,900/5,000 lbf | PASSED |
| Thermal Expansion | Max. - $7.5 \times 10^{-5}$ in/in/° F. | PASSED |

TABLE II

AREMA Guidance for Plastic Composite Cross Ties Test Results for Select Carpet Waste Composites in accordance with Example II
AREMA Guidance for Plastic Composite Cross Ties (Example II)

| | | |
|---|---|---|
| Modulus of Elasticity | Min. - 170,000 psi | PASSED |
| Modulus of Rupture | Min. - 2,000 psi | PASSED |
| Rail Seat Compression | Min. - 900 psi | PASSED |
| Single Tie Lateral Push | Min. - 2,000 lbf | PASSED |
| Spike/Screw Pullout | Min. - 1,900/5,000 lbf | PASSED |
| Thermal Expansion | Max. - $7.5 \times 10^{-5}$ in/in/° F. | PASSED |

TABLE III

AREMA Guidance for Plastic Composite Cross Ties Test Results for Select Carpet Waste Composites in accordance with Example III
AREMA Guidance for Plastic Composite Cross Ties (Example III)

| | | |
|---|---|---|
| Modulus of Elasticity | Min. - 170,000 psi | PASSED |
| Modulus of Rupture | Min. - 2,000 psi | PASSED |
| Rail Seat Compression | Min. - 900 psi | PASSED |
| Single Tie Lateral Push | Min. - 2,000 lbf | PASSED |
| Spike/Screw Pullout | Min. - 1,900/5,000 lbf | PASSED |
| Thermal Expansion | Max. - $7.5 \times 10^{-5}$ in/in/° F. | PASSED |

As shown by the results of Test Method I, the Ex. I, Ex. II, and Ex. III carpet waste composites exhibited passing performance under the American Railway Engineering and Maintenance-of-way Association (AREMA) Guidance for Plastic Composite Cross Ties, which examined modules of elasticity, modulus of rupture, rail seat compression, single tie lateral push, spike/screw pullout, and thermal expansion. Accordingly, the results of Testing Method I illustrates that the carpet waste composites manufactured in accordance with the teachings presented herein exhibit physical properties that are equivalent or better than those of existing plastic composite rail ties.

The order of execution or performance of the methods and steps illustrated and described herein is not essential, unless otherwise specified. That is, elements of the methods and steps may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method of manufacturing a composite construction material, the method comprising:
providing first, second, and third cleaned, unadulterated layers of intact carpet, each of the first, second, and third unadulterated layers of intact carpet having a backing side and a tufted side;
creating an initial, unfused carpet layer by placing the first and second cleaned, unadulterated layers of intact carpet side-to-side with homogenous and adhesive contact therebetween, the adhesive contact including an adhesive material;

applying first heat and pressure to the initial, unfused carpet layer within a first carrier having a first fixed height;

applying first cooling to the initial, unfused carpet layer to form an initial, fused carpet layer;

creating an iterative, unfused carpet layer by placing the third cleaned, unadulterated layer of intact carpet side-to-side with the initial, fused carpet layer, the initial, fused carpet layer forming adhesive contact with the third cleaned, unadulterated layer of intact carpet, the adhesive contact including the adhesive material;

applying second heat and pressure to the iterative, unfused carpet layer within a second carrier having a second fixed height, the second fixed height being greater than the first fixed height; and applying second cooling to the iterative, unfused carpet layer to form an iterative, fused carpet layer.

2. The method as recited in claim 1, wherein the adhesive material further comprises an adhesive selected from the group consisting of urethane adhesives, epoxy adhesives, melamine adhesives, and formaldehyde adhesives.

3. The method as recited in claim 1, wherein the adhesive material further comprises a urethane adhesive derived from a PET polyol reacted with an isocyanate.

4. The method as recited in claim 1, wherein the first cleaned, unadulterated layer of carpet further comprises nylon fibers.

5. The method as recited in claim 1, wherein the first cleaned, unadulterated layer of carpet further comprises polyester fibers.

6. The method as recited in claim 1, wherein the first carrier further comprises one of first and second aluminum plates and first and second steel plates.

7. The method as recited in claim 1, wherein the first fixed height further comprises a distance from 80 thousandths of an inch (0.20 cm) to 280 thousandths of an inch (0.71 cm).

8. The method as recited in claim 1, wherein the first fixed height further comprises a distance from 130 thousandths of an inch (0.33 cm) to 230 thousandths of an inch (0.58 cm).

9. The method as recited in claim 1, wherein the first fixed height further comprises a distance less than 200 thousandths of an inch (0.51 cm).

10. The method as recited in claim 1, wherein the first fixed height further comprises a distance of 180 thousandths of an inch (0.46 cm).

11. The method as recited in claim 1, wherein applying heat further comprises applying heat between 250° F. (121° C.) and 450° F. (232° C.).

12. The method as recited in claim 1, wherein applying first heat and pressure further comprises applying heat at 350° F. (176° C.).

13. The method as recited in claim 1, wherein applying first heat and pressure further comprises applying a continuous physical force to hold the initial, unfused carpet layer at the first fixed height.

14. The method as recited in claim 1, wherein applying first cooling further comprises applying cooling at 35° F. (1.7° C.) to 100° F. (37° C.).

15. The method as recited in claim 1, wherein applying first cooling further comprises applying cooling at 42° F. (5.6° C.).

16. The method as recited in claim 1, wherein the second carrier and the first carrier are identical.

17. The method as recited in claim 1, wherein the second fixed height is twice the first fixed height.

18. A method of manufacturing a composite construction material, the method comprising:

providing first, second, and third cleaned, unadulterated layers of intact carpet, each of the first, second, and third cleaned, unadulterated layers of intact carpet having a backing side and a tufted side;

creating an initial, unfused carpet layer by placing the first and second cleaned, unadulterated layers of intact carpet side-to-side with homogenous and adhesive contact therebetween, the adhesive contact including an adhesive material;

applying first heat and pressure to the initial, unfused carpet layer within a first carrier having a first fixed height;

applying first cooling to the initial, unfused carpet layer to form an initial, fused carpet layer;

creating an iterative, unfused carpet layer by placing the third cleaned, unadulterated layers of intact carpet side-to-side with the initial, fused carpet layer, the initial, fused carpet layer forming non-adhesive non-binding contact with the third cleaned, unadulterated layer of intact carpet;

applying second heat and pressure to the iterative, unfused carpet layer within a second carrier having a second fixed height, the second fixed height being greater than the first fixed height; and applying second cooling to the iterative, unfused carpet layer to form an iterative, fused carpet layer.

19. The method as recited in claim 18, wherein the adhesive material further comprises a material selected from the group consisting of urethane adhesive and urethane adhesives derived from a PET polyol reacted with an isocyanate.

20. A method of manufacturing a composite construction material, the method comprising:

providing first, second, and third cleaned, unadulterated layers of intact carpet, each of the first, second, and third cleaned, unadulterated layers of intact carpet having a backing side and a tufted side;

creating an initial, unfused carpet layer by placing the first and second cleaned, unadulterated layers of intact carpet side-to-side with homogenous and non-adhesive, non-binding contact therebetween;

applying first heat and pressure to the initial, unfused carpet layer within a first carrier having a first fixed height;

applying first cooling to the initial, unfused carpet layer to form an initial, fused carpet layer;

creating an iterative, unfused carpet layer by placing the third cleaned, unadulterated layer of intact carpet tufted side-to-side with the initial, fused carpet layer, the initial, fused carpet layer forming homogeneous and adhesive contact with the third cleaned, unadulterated layer of intact carpet, the adhesive contact including an adhesive material;

applying second heat and pressure to the iterative, unfused carpet layer within a second carrier having a second fixed height, the second fixed height being greater than the first fixed height; and applying second cooling to the iterative, unfused carpet layer to form an iterative, fused carpet layer.

* * * * *